UNITED STATES PATENT OFFICE.

GEORGE F. BIHN, OF PHILADELPHIA, PENNSYLVANIA, ASSIGNOR TO THE PENNSYLVANIA SALT MANUFACTURING COMPANY, OF SAME PLACE.

MANUFACTURE OF WHITE ALUMINOUS CAKE.

SPECIFICATION forming part of Letters Patent No. 234,704, dated November 23, 1880.

Application filed July 6, 1880. (No specimens.)

*To all whom it may concern:*

Be it known that I, GEORGE F. BIHN, of the city and county of Philadelphia and State of Pennsylvania, have invented an Improvement in Processes for Manufacturing a White Aluminous Cake, of which the following is a specification.

The object of this invention is to produce a white aluminous cake richer in alumina from halloysite and bauxite.

In carrying out my invention I pulverize or reduce halloysite to a state of fine subdivision, and with it I mix finely-pulverized bauxite, and to this mixture I add sulphuric acid in sufficient quantity to form a sulphate of alumina or aluminous cake, and when the chemical reactions cease or are about to cease I add to the mass sulphites, bisulphites, or hyposulphites of the alkalies, alkaline earths, or the metallic bases to the semi-fused mass, and then run the resulting mass of aluminous cake off to cool. If the mass be run off before the addition of the sulphites, &c., the iron contained in the bauxite in the form of the peroxide will color the aluminous cake so produced, as set forth in a pending application of mine bearing even date with this; but by the addition of the sulphites, bisulphites, or the hyposulphites, sulphurous acid is evolved in the nascent state and combines with part of the oxygen of the peroxide of iron, reducing it to the state of the lower oxide or protoxide, which is colorless; hence when the iron is reduced to this condition it cannot color the aluminous cake.

The broad use of sulphites, bisulphites, or hyposulphites is not claimed in this application, but is fully set forth in another pending application of mine in conjunction with Robert Heerlein.

The proportion of the minerals used will be about as follows: To six hundred pounds of pulverized halloysite I add from one hundred to two hundred pounds of finely pulverized bauxite, and to this mixture of ore I add sufficient sulphuric acid to make an aluminous cake, and when the chemical reaction is about to cease I add about five pounds of sulphites, bisulphites, or hyposulphites, and then run off the mass and cool the same.

I do not claim, broadly, mixing together a silicate and an oxide of alumina by means of sulphuric acid, as Spence describes a method of treating a silicate of alumina with sulphuric acid, and after digesting it treating the liquor with an oxide of alumina.

Having now described my invention, what I claim as new, and desire to secure by Letters Patent, is—

The herein-described process of manufacturing a white aluminous cake, consisting in treating halloysite in a pulverized condition or other state of fine subdivision mixed with finely pulverized bauxite with sulphuric acid, and then treating the semi-fused mass formed with sulphites, bisulphites, or hyposulphites of alkalies, alkaline earths, or the metallic bases, substantially as and for the purpose specified.

In testimony of which invention I hereunto set my hand.

GEORGE F. BIHN.

Witnesses:
R. M. HUNTER,
ROBT. A. CAVIN.